(12) United States Patent
Funabashi et al.

(10) Patent No.: US 9,314,783 B2
(45) Date of Patent: Apr. 19, 2016

(54) RESIN-SUPPORTED CATALYST AND METHOD FOR PREPARING RESIN-SUPPORTED CATALYST

(75) Inventors: Masahiko Funabashi, Tokyo (JP); Toru Kamata, Tokyo (JP); Nagatoshi Nishiwaki, Kochi (JP)

(73) Assignees: SUMITOMO BAKELITE CO., LTD., Tokyo (JP); KOCHI UNIVERSITY OF TECHNOLOGY, Kami-shi (JP)

( * ) Notice: Subject to any disclaimer, the term of this patent is extended or adjusted under 35 U.S.C. 154(b) by 0 days.

(21) Appl. No.: 14/342,315

(22) PCT Filed: Aug. 28, 2012

(86) PCT No.: PCT/JP2012/005388
§ 371 (c)(1),
(2), (4) Date: Feb. 28, 2014

(87) PCT Pub. No.: WO2013/035270
PCT Pub. Date: Mar. 14, 2013

(65) Prior Publication Data
US 2014/0213434 A1 Jul. 31, 2014

(30) Foreign Application Priority Data
Sep. 6, 2011 (JP) ................................. 2011-193647
Aug. 6, 2012 (JP) ................................. 2012-174359

(51) Int. Cl.
*B01J 31/28* (2006.01)
*B01J 31/08* (2006.01)
*B01J 31/22* (2006.01)
*B01J 37/16* (2006.01)
*B01J 37/18* (2006.01)
*B01J 21/06* (2006.01)
*B01J 35/10* (2006.01)
*B01J 23/02* (2006.01)
*B01J 23/14* (2006.01)
*B01J 23/22* (2006.01)
*B01J 23/26* (2006.01)
*B01J 23/34* (2006.01)
*B01J 23/36* (2006.01)
*B01J 23/42* (2006.01)
*B01J 23/44* (2006.01)
*B01J 23/46* (2006.01)
*B01J 23/50* (2006.01)
*B01J 23/745* (2006.01)
*B01J 23/75* (2006.01)
*B01J 23/755* (2006.01)
*B01J 35/00* (2006.01)

(52) U.S. Cl.
CPC ............. *B01J 31/28* (2013.01); *B01J 21/063* (2013.01); *B01J 23/02* (2013.01); *B01J 23/14* (2013.01); *B01J 23/22* (2013.01); *B01J 23/26* (2013.01); *B01J 23/34* (2013.01); *B01J 23/36* (2013.01); *B01J 23/42* (2013.01); *B01J 23/44* (2013.01); *B01J 23/462* (2013.01); *B01J 23/464* (2013.01); *B01J 23/50* (2013.01); *B01J 23/745* (2013.01); *B01J 23/75* (2013.01); *B01J 23/755* (2013.01); *B01J 31/08* (2013.01); *B01J 31/2239* (2013.01); *B01J 35/006* (2013.01); *B01J 35/1014* (2013.01); *B01J 35/1019* (2013.01); *B01J 37/16* (2013.01); *B01J 37/18* (2013.01); *B01J 2531/824* (2013.01)

(58) Field of Classification Search
CPC ............ B01J 23/06; B01J 23/14; B01J 23/38; B01J 23/48; B01J 23/74; B01J 31/0202; B01J 35/1014; B01J 35/1019; B01J 37/08
USPC .......................................... 502/159, 305–355
IPC ........... B01J 23/06, 23/14, 23/38, 23/48, 23/74, B01J 31/0202, 35/1014, 35/1019, 37/08
See application file for complete search history.

(56) References Cited

U.S. PATENT DOCUMENTS

| 5,104,575 | A | * | 4/1992 | King et al. | 516/204 |
| 5,488,023 | A | * | 1/1996 | Gadkaree et al. | 502/182 |
| 5,998,328 | A | * | 12/1999 | Dawes et al. | 502/182 |
| 8,314,045 | B1 | * | 11/2012 | Sinoncelli et al. | 502/182 |
| 2007/0060720 | A1 | * | 3/2007 | Kiuchi | B32B 15/08 525/524 |
| 2010/0217044 | A1 | * | 8/2010 | Nomura et al. | 564/463 |

FOREIGN PATENT DOCUMENTS

| JP | 2-307976 A | 12/1990 |
| JP | 7-238183 A | 9/1995 |
| JP | 2000-140643 A | 5/2000 |
| JP | 2002-201284 A | 7/2002 |
| JP | 2007-237065 A | 9/2007 |
| JP | 2010-22980 A | 2/2010 |
| JP | 2010-207777 A | 9/2010 |

OTHER PUBLICATIONS

Takagi, "Industrial noble metal catalysts practice and reaction of practical metal catalyst", published by Jetty Co., Ltd., the first edition, May 26, 2003, pp. 6-7.
"Catalyst Handbook", published by Kodansha Ltd., the first printing, Dec. 10, 2008, pp. 309-311.
International Search Report dated Dec. 18, 2012 issued in corresponding application No. PCT/JP2012/005388.

* cited by examiner

*Primary Examiner* — Patricia L Hailey
(74) *Attorney, Agent, or Firm* — Westerman, Hattori, Daniels & Adrian, LLP

(57) ABSTRACT

Provided is a resin-supported catalyst including a cured body of a thermosetting resin and fine particles having catalytic activity supported onto the surface of the cured body, in which the thermosetting resin has a phenolic hydroxyl group.

4 Claims, No Drawings

RESIN-SUPPORTED CATALYST AND METHOD FOR PREPARING RESIN-SUPPORTED CATALYST

TECHNICAL FIELD

The present invention relates to a resin-supported catalyst and a method for preparing a resin-supported catalyst.

BACKGROUND ART

When a catalyst is used in a state where it is supported on a support, the separation of the catalyst from a reaction product from a complex system after a reaction is relatively easy. As such, recovery and reuse of the catalyst supported on the support (hereinafter, referred to as a supported catalyst) are easy. Specifically, in a case where an expensive noble metal is used as a catalyst, these are effective means (for example, refer to Patent Documents 1 and 2).

RELATED DOCUMENT

Patent Document

[Patent Document 1] Japanese Unexamined Patent Publication No. 2000-140643
[Patent Document 2] Japanese Unexamined Patent Publication No. 2010-22980

Non-Patent Document

[Non-Patent Document 1] "Industrial noble metal catalysts—practice and reaction of practical metal catalyst-" written by Muroi Takagi, published by Jetty Co., Ltd., the first edition, May 26, 2003, P. 6-7
[Non-Patent Document 2] "Catalyst Handbook" edited by Catalysis Society of Japan, published by Kodansha Ltd., the first printing, Dec. 10, 2008, P. 309-311

DISCLOSURE OF THE INVENTION

However, a binding force between a catalyst and a support in a supported catalyst is not necessarily strong. Therefore, there are cases where the catalyst is detached from the support during the use and the detached catalysts agglomerate to each other. In the case, due to the repeat use of the supported catalyst, the catalytic activity gradually becomes decreased.

As a method for suppressing the deactivation of the supported catalyst due to repeated use, a method described in Patent Document 1 is exemplified. In Patent Document 1, a mixture of a thermosetting resin and a catalyst composed of a metal or a metal compound or a precursor thereof is heated to 500° C. or higher under a non-oxidizing atmosphere to carbonize the thermosetting resin, thereby supporting the metal or the metal compound onto the carbide. In a case where a cured body of a thermosetting resin is carbonized, the cured body is shrunk but the shape thereof is maintained. On the other hand, in many cases, a catalyst composed of a metal or a metal compound is stable under the condition in which a thermosetting resin is carbonized. Therefore, a catalyst and the like are mixed with a thermosetting resin and the thermosetting resin is cured to carbonize, thereby obtaining a carbon material in which a catalyst material is firmly immobilized.

Furthermore, Patent Document 2 discloses that fine particles having catalytic activity are supported onto a spherical resin particle surface and a coating layer having a specific thickness composed of a thermosetting resin is formed so as to cover the spherical resin particles. By providing the coating layer composed of the thermosetting resin in this manner, detachment of fine particles having catalytic activity during use is suppressed, and separation and recovery from a reaction product after use become easy.

In the supported catalyst described in Patent Documents 1 and 2, there is a possibility that the supports are agglomerated to each other. In a case where the supports are agglomerated to each other, the reaction efficiency decreases since a reactant is less likely to contact with a catalyst. That is, the activity per support decreases.

However, as described in Patent Document 1, if a mixture of a thermosetting resin and a catalyst or a precursor thereof is heated to carbonize the thermosetting resin and the catalyst is supported onto the carbide, the catalyst is incorporated inside the carbide. In general, a catalytic reaction proceeds on a catalyst surface to which a reactant can reach. Therefore, fine catalyst particles, that are incorporated inside a carbide and particularly, the ones that are incorporated at locations difficult for a reactant to reach, are not easily used in the catalytic reaction due to the contact efficiency between the reactant and the catalyst being low. In this regard, the present inventors of this application found that an improvement of the reaction efficiency of a catalyst leads to an improvement of the catalytic activity.

Furthermore, as described in Patent Document 2, in a case where a catalyst is covered with a coating layer composed of a thermosetting resin, the coating layer inhibits a contact between a catalyst and a reactant. Therefore, since the locations with which a reactant is less likely to contact are present in the catalyst described in Patent Document 2, there was a room for increasing the contact efficiency with the reactant. In this regard, the present inventors of this application found that an improvement of the reaction efficiency of a catalyst leads to an improvement of the catalytic activity.

The invention has been made in consideration of the above-described circumstances, and provides a resin-supported catalyst that has excellent repeatability and catalyst use efficiency.

As a result of intensive studies on how to improve a repeatability and catalyst use efficiency with respect to a resin-supported catalyst which uses a cured body of a thermosetting resin as a catalyst support, the present inventors found that in a case where a cured body of a thermosetting resin having a phenolic hydroxyl group is used as a support for supporting the catalyst, a resin-supported catalyst with excellent catalyst use efficiency is obtained since the detachment of fine catalyst particles from the support can be suppressed, thereby completing the invention.

According to the present invention, there is provided a resin-supported catalyst including a cured body of a thermosetting resin and fine particles having catalytic activity supported onto the surface of the cured body, in which the thermosetting resin has a phenolic hydroxyl group.

Furthermore, according to the present invention, there is provided a method for preparing a resin-supported catalyst including a curing step in which a thermosetting resin having a phenolic hydroxyl group is cured and a supporting step in which fine particles having catalytic activity supported onto the surface of the cured body obtained in the curing step are supported.

According to the present invention, the resin-supported catalyst with excellent repeatability and catalyst use efficiency can be provided.

DESCRIPTION OF EMBODIMENTS

Hereinafter, embodiments of the resin-supported catalyst and method for preparing the same according to the invention will be described with reference to specific examples.

The resin-supported catalyst according to the embodiment includes a cured body of a thermosetting resin having a phenolic hydroxyl group and fine particles having catalytic activity supported onto the surface of the cured body of the thermosetting resin (hereinafter, also referred to as "fine catalyst particles").

(First Embodiment)

In the resin-supported catalyst according to the embodiment, a reactant is likely to reach to fine catalyst particles since the fine catalyst particles are supported onto a surface of a cured body of a thermosetting resin. For this reason, the catalyst use efficiency is excellent.

Furthermore, the resin-supported catalyst according to the embodiment is excellent in the repeatability of a catalyst. The reason for this is not entirely clear, however, it is thought to be as follows. In the resin-supported catalyst according to the embodiment, a cured body of a thermosetting resin having a phenolic hydroxyl group on the surface of the cured body as a support is used. Then, it is thought that a catalyst is supported by a phenolic hydroxyl group present in a catalyst support. In this manner, it is thought that fine catalyst particles are firmly supported compared with the supported catalyst in the related art. Therefore, it is thought that the fine catalyst particles were less likely detached from the cured body of the thermosetting resin which is the catalyst support and thus the repeatability and the catalyst use efficiency were improved.

Furthermore, as described above, the fine catalyst particles in the resin-supported catalyst according to the embodiment are supported to a phenolic hydroxyl group present distributably in a cured body of a thermosetting resin which is a catalyst support. In this manner, it is considered that since the fine catalyst particles in the resin-supported catalyst according to the embodiment are supported to a phenolic hydroxyl group, the fine catalyst particles are uniformly dispersed to the catalyst support compared with a supported catalyst in the related art. Therefore, it is considered that agglomeration of the fine catalyst particles during use is less likely generated and the repeatability and the catalyst use efficiency are improved.

<Cured Body of Thermosetting Resin>

A cured body of a thermosetting resin is used as a catalyst support in the embodiment. The cured body of a thermosetting resin, for example, may be formed in a particle shape, a film shape, and a uniform layer shape. The thermosetting resin before a curing treatment is not particularly limited as long as the thermosetting resin has a phenolic hydroxyl group, however, it is preferable that the thermosetting resin includes a phenol resin or a derivative thereof.

A phenolic hydroxyl equivalent of the thermosetting resin according to the cured body of the thermosetting resin in the embodiment is preferably 30 g/eq or greater and more preferably 35 g/eq or greater. If the phenolic hydroxyl equivalent of the thermosetting resin is equal to or greater than the above-specified lower limit value, a cured body having a hydroxyl group on the surface is obtained and detachment of the catalyst can be suppressed during use.

Furthermore, a phenolic hydroxyl equivalent of the thermosetting resin in the cured body of the thermosetting resin according to the embodiment is 500 g/eq or less, preferably 400 g/eq or less and more preferably 350 g/eq or less. If the phenolic hydroxyl equivalent of the thermosetting resin is in the above-described region, it is possible to provide a resin-supported catalyst having excellent catalytic activity. In a case where a phenolic hydroxyl equivalent of the thermosetting resin is equal to or less than the above-specified upper limit value, a phenolic hydroxyl group on the surface of the cured body becomes large and therefore, it is possible to maintain the holding force of the catalyst without being weaken. Furthermore, a phenolic hydroxyl equivalent can be quantified by a known method such as an acetylation method.

The phenol resin according to the embodiment is obtained by reacting phenols and aldehydes in the presence of an alkaline catalyst or an acid catalyst and has one or more phenolic hydroxyl group in a molecule.

For example, a phenol resin, a cresol resin, a resorcinol resin, a xylenol resin, a naphthol resin, a bisphenol A resin, an aralkyl phenol resin, a biphenyl aralkyl phenol resin and modified phenol resins, as exemplified by a cashew nut oil having a phenolic hydroxyl group are exemplified. Furthermore, various modified phenol resins such as xylene-modified phenol resins, oil-modified phenol resins modified with phenols and rosin, terpene oil, and rubber-modified phenol resins modified with rubber which include a material having a phenolic hydroxyl group, can be used.

Phenols used to obtain the above-described phenol resins preferably have a phenolic hydroxyl group in a molecule and furthermore may have a substituent other than a phenolic hydroxyl group. For example, phenol, cresols such as o-cresol, m-cresol and p-cresol, mixed cresols thereof, xylenols such as 2,3-xylenol, 2,4-xylenol, 2,5-xylenol, 2,6-xylenol, 3,4-xylenol and 3,5-xylenol, ethylphenols such as o-ethylphenol, m-ethylphenol and p-ethylphenol, isopropyl phenol, butylphenols such as butyl phenol and p-tert-butylphenol, alkylphenols such as p-tert-amylphenol, p-octylphenol, p-nonylphenol and p-cumylphenol, halogenated phenols such as fluorophenol, chlorophenol, bromophenol and iodophenol, monohydric phenol substitutes such as p-phenylphenol, amino phenol, nitrophenol, dinitrophenol and trinitrophenol, monovalent naphthols such as 1-naphthol and 2-naphthol, polyhydric phenols such as resorcinol, alkyl resorcin, pyrogallol, catechol, alkylcatechol, hydroquinone, alkylhydroquinone, phloroglucin, bisphenol A, bisphenol F, bisphenol E, bisphenol S and dihydroxy naphthalene, cashew nut oil composed of a material having a phenolic hydroxyl group and the like are exemplified. These can be used alone or in combination of two or more kinds thereof. Furthermore, copolymers of these phenols which have a phenolic hydroxyl group and materials which do not have a phenolic hydroxyl group may be used. Thus, a phenol resin having one or more phenolic hydroxyl group in a molecule can be obtained.

Furthermore, as aldehydes used to obtain the above-described phenol resins, for example, formaldehyde, paraformaldehyde, trioxane, acetaldehyde, propionaldehyde, polyoxymethylene, chloral, hexamethylenetetramine, furfural, glyoxal, n-butylaldehyde, caproaldehyde, allyl aldehyde, benzaldehyde, crotonaldehyde, acrolein, tetraoxymethylene, phenyl acetaldehyde, o-tolualdehyde, salicylaldehyde, paraxylene dimethyl ether and the like are exemplified. These can be used alone or in combination of two or more kinds thereof.

A method in which the phenols and the aldehydes are reacted is not particularly limited, however, a known method can be adopted.

A catalyst for obtaining the phenol resin is not particularly limited, however, an acid catalyst, a base catalyst, a transition metal salt catalyst and the like are exemplified. As the acid catalyst, for example, inorganic acids such as hydrochloric acid, sulfuric acid and phosphoric acid, and organic acids such as oxalic acid, p-toluenesulfonic acid and organic phosphonic acids can be used. Furthermore, as the base catalyst, for example, alkali metal hydroxides such as sodium hydroxide, potassium hydroxide and lithium hydroxide, alkali earth metal hydroxides such as calcium hydroxide and barium hydroxide, and amines such as ammonia and alkylamine can be used. As a transition metal salt catalyst, zinc oxalate and zinc acetate and the like are exemplified.

A specific surface area of the resin-supported catalyst according to the embodiment obtained by a BET method is preferably equal to or less than 300 m²/g and particularly preferably equal to or less than 200 m²/g. If the specific surface area is equal to or less than the above-specified upper limit value, the amount of the fine catalyst particles incorporated inside the cured body of the thermosetting resin can be suppressed. For this reason, it is possible to further improve the catalyst use efficiency.

Furthermore, the shape of the cured body of a thermosetting resin according to the embodiment is not particularly limited. A solid form, a powder form, a spherical form and the like are exemplified and any form can be used. Alternatively, after the thermosetting resin is mixed with an organic or an inorganic filler and the resultant is molded, a curing treatment may be performed or after the resultant is impregnated into other substrates, curing treatment may be performed.

<Fine Catalyst Particles>

The fine catalyst particles supported onto the surface of a cured body of a thermosetting resin according to the embodiment may be any of a metal, a metal oxide and a metal compound and is not particularly limited as long as it has catalytic activity. For example, the fine particles composed of at least one type of metal compound selected from metals such as titanium, chromium, cobalt, nickel, copper, ruthenium, rhodium, palladium, rhenium, osmium, platinum, iron, zinc, manganese, magnesium, calcium, silver, vanadium and tin, and the oxides thereof, other metal compounds and complexes such as organic titanium are exemplified. Furthermore, a complex including at least two or more kind of these can also be used. Among these, particularly, palladium or platinum is preferably used.

An average particle diameter of the fine catalyst particles is preferably 1 µm or less. By doing this, it is possible to provide the resin-supported catalyst having further excellent catalytic activity. Furthermore, it is possible to also use nano-size fine metal particles having an average particle diameter of being equal to or greater than 1 nm to being equal to or less than 100 nm. The mass ratio of the substrate and the cured body of the thermosetting resin and the catalyst particles may be suitably determined. For example, the ratio of the cured body of the thermosetting resin:the fine catalyst particles is about 1:1 to 10000:1.

Hereinafter, a method for preparing the resin-supported catalyst according to the embodiment will be described.

Furthermore, a preparing method according to the embodiment has a step for preparing a cured body which becomes a catalyst support by curing a thermosetting resin having a phenolic hydroxyl group and a step for supporting fine catalyst particles onto the surface of the cured body which is a catalyst support. In a preparing method according to the embodiment, the fine catalyst particles are preferably supported after obtaining the cured body of the thermosetting resin which is a catalyst support. By doing this, it is possible to prevent the fine catalyst particles from being incorporated inside the cured body of the thermosetting resin which is a catalyst support. For this reason, it is possible to further improve the repeatability and the catalyst use efficiency.

First, a curing treatment method of the thermosetting resin will be described.

The curing treatment method of the thermosetting resin according to the embodiment is not particularly limited and a known method can be used.

In a case of using a resol type phenol resin as the thermosetting resin, the resin can be cured by heating. Alternatively, a method in which acids such as p-toluenesulfonic acid and phenol sulfonic acid are mixed and the resultant is cured at room temperature or is cured from heating is exemplified.

Furthermore, in a case of using a novolac type phenol resin as a phenol resin, a method in which curing agents such as hexamethylenetetramine are mixed with an additive compound and the resultant is heated to cure, and a method in which thermosetting resins such as an epoxy resin, a polyisocyanate and a melamine resin are mixed with an additive compound and the resultant is heated to cure are exemplified.

The curing treatment temperature of the thermosetting resin according to the embodiment is not particularly limited, however, the curing treatment temperature is preferably 250° C. or lower. If the curing temperature is equal to or lower than the above-specified upper limit value, an economical curing rate is obtained and the decomposition of the main chain of the phenol resin can be suppressed.

<Supporting Method of Fine Catalyst Particles>

A supporting method of the above-described fine catalyst particles onto the cured body of the thermosetting resin according to the embodiment will be described in detail. In the embodiment, after preparing a cured body of the thermosetting resin, fine catalyst particles are preferably supported onto the surface of the cured body. By doing this, it is possible to suppress the fine catalyst particles being incorporated inside the cured body.

Supporting of the fine catalyst particles onto the cured body of a thermosetting resin is not particularly limited in the embodiment, and a known method can be adopted. For example, a method in which after the cured body of a thermosetting resin and a colloidal solution of a metal compound serving as a catalyst are mixed and the metal compound is reduced, the resultant is solid-liquid separated and is dried.

Moreover, the resin-supported catalyst obtained by the embodiment may be formed on the substrate surface. Hereinafter, the catalyst in which the resin-supported catalyst is formed on the substrate surface will be described as "a substrate-supported catalyst".

<Substrate-supported Catalyst>

The substrate-supported catalyst according to the embodiment is a sheet shape or a plate shape and the shape can be variously modified in conformity with the shape of a reaction apparatus. The shape of a catalyst sheet can be variously modified in conformity with the shape of the reaction tube in the reaction apparatus such as a folded state and a rounded state, for example. In a case where through holes are provided in the resin-supported catalyst of a sheet shape, the resin-supported catalyst can be also used as a catalytic filter.

<Substrate>

Then, the shape of substrate is not particularly limited, and, for example, a particle shape, a sheet shape or a plate shape is used. Among these, a sheet shape or a plate shape is preferable.

Furthermore, the substrate is preferably a porous body or a substrate in which a mesh structure is formed and particularly, and, further preferably a substrate in which a mesh structure is formed. By doing this, it is possible to increase the surface area and it is possible to form greater amount of cured body of a thermosetting resin onto the substrate surface as a catalyst support. Therefore, it is possible to support finer catalyst particles. Therefore, the reaction field in the substrate-supported catalyst increases and accordingly it is possible to improve the reaction activity. Here, the porous body may be one having a plurality of irregularities and one in which a plurality of holes (hereinafter, referred to as a through hole) which communicate from the surface to the back surface is provided.

Furthermore, the substrate according to the embodiment is preferably a plate having a mesh structure. By doing this, it is possible to significantly improve the contact efficiency between the fine catalyst particles and the reactant. That is, it is possible to improve the reaction activity and it is possible to provide a substrate-supported catalyst having further excellent catalytic activity.

Furthermore, by using a substrate of a plate shape having a mesh structure, it is also possible to always supply the unreacted reactant to the fine catalyst particles which form the reaction field. In a case of using the flow reaction vessel using a liquid or a gas reactant in the reaction apparatus, it is very effective to improve the reaction efficiency. In this manner, since the unreacted reactant can be always supplied to the fine catalyst particles, it is possible to significantly improve the activity of the fine catalyst particles.

Moreover, in a case where the substrate is provided with through holes, the through holes may form a honeycomb structure. In this case, it is possible to improve the mechanical strength of the substrate itself. Furthermore, it is also possible to disperse the fine catalyst particles uniformly and at a high density.

The substrate according to the embodiment may be compounds and polymers including a polar functional group such as a carbonyl group, an imide group and a hydroxy group in the chemical structure and may be compounds and polymers not including a polar functional group. As the compounds and the polymers including a polar functional group, for example, celluloses, polyurethanes, polyamides, polyesters and the like are used. As the compounds and the polymers not including a polar functional group, for example, polyethylene, polypropylene, polymethylpentene, polybutene, polybutadiene, polystyrene, polyisobutylene, fluororesins such as polytetrafluoroethylene, natural rubber, styrene-butadiene rubber and butyl rubber and the like are used.

<Method for Forming Cured Body of Thermosetting Resin on Surface of Substrate>

A method for forming the cured body of the thermosetting resin onto the surface of the substrate according to the embodiment can be suitably selected depending on the shape of the substrate. For example, in a case where the substrate is a mesh shape, a method in which a solution of a solid resin or a powder resin or a liquid resin is impregnated and cured onto the substrate, and a method in which a solid resin or a powder resin is heated to melt and is impregnated and cured onto the substrate, and the like are used. On the other hand, in a case where the substrate is a particle shape, a method in which the cured body of the thermosetting resin is coated, and the like are used. By doing this, it is possible to uniformly form the cured body of the thermosetting resin onto the substrate.

(Second Embodiment)

A second embodiment relates to a specific method for preparing fine catalyst particles used in the first embodiment.

In a case of making fine particles have the catalytic activity, before supporting the fine particles onto a catalyst support, it is necessary to be reduced in advance. In the related art, in a case of obtaining fine catalyst particles having catalytic activity, a method in which fine catalyst particles are reduced using a reducing agent in advance has been used (Non-Patent Documents 1 and 2). As the reducing agent used at this time, for example, a reducing agent selected from a group consisting of hydrogen, carbon monoxide, aldehydes, carboxylic acids, amines, metal hydrides and hydrazine is exemplified.

However, a method in which fine catalyst particles are reduced using a reducing agent in advance was insufficient from the viewpoint of agglomeration of the fine catalyst particles.

On the other hand, in the embodiment, it is possible to prepare a resin-supported catalyst with excellent repeatability and catalyst use efficiency by reducing fine catalyst particles using not a reducing agent but a phenolic hydroxyl group. In this manner, it is possible to prevent the fine catalyst particles from agglomerating by reducing the fine catalyst particles using a phenolic hydroxyl group. That is, in a case where the fine catalyst particles are reduced by the phenolic hydroxyl group, it is possible to uniformly support the fine catalyst particles onto the surface of a cured body of a thermosetting resin which is a catalyst support. Therefore, the reaction efficiency is improved and it is possible to produce a resin-supported catalyst with excellent repeatability and use efficiency.

Moreover, when the fine catalyst particles are reduced by the phenolic hydroxyl group, if the above-described reducing agent does not exhibit a reducing action with respect to the material which forms the fine catalyst particles and does not inhibit the reduction reaction of the fine catalyst particles by a phenolic hydroxyl group, the reducing agent may be included in a catalyst support reaction solution. Specifically, being equal to or greater than 0 mol to being equal to or less than 10 mol of the above-described reducing agent may be included and being equal to or greater than 0 mol to being equal to or less than 5 mol of the reducing agent is preferably included in the catalyst support reaction solution with respect to 1 mol of the material which forms the fine catalyst particles. By doing this, it is possible to reduce the fine catalyst particles on the surface of a thermosetting resin having a phenolic hydroxyl group. Therefore, it is possible to uniformly and finely support the fine catalyst particles onto the surface of a cured material of the thermosetting resin. Accordingly, it is possible to obtain a resin-supported catalyst with excellent repeatability and use efficiency.

Furthermore, it is most preferable that the above-described reducing agent is not included in the catalyst support reaction solution. By doing this, agglomeration of the fine catalyst particles which are supported is less likely to occur compared to the resin-supported catalysts obtained by a method in the related art. Therefore, the resin-supported catalyst obtained by a method according to the embodiment is significantly excellent in the repeatability and the catalyst use efficiency of the resin-supported catalyst compared to the resin-supported catalysts obtained by a method in the related art. The reason for this is not entirely clear, however, it is considered that in the preparing method according to the embodiment, since the reducing agent molecules which inhibit the dispersion of the fine catalyst particles were not included in the catalyst support reaction solution at the time of reducing the fine catalyst particles, the fine catalyst particles were uniformly and finely dispersed onto the surface of a cured material of a thermosetting resin. Therefore, in the resin-supported catalyst according to the embodiment, the fine catalyst particles are more firmly supported onto the surface of a cured body of a thermosetting resin compared with resin-supported catalysts in the related art.

Hereinafter, the differences between the preparing methods of the resin-supported catalyst of the embodiment and in the related art will be described in more detail.

As described above, in the preparing methods of the resin-supported catalyst in the related art, fine catalyst particles are reduced using a reducing agent in advance. As the reducing agent used herein, for example, hydrogen, carbon monoxide and aldehydes such as formaldehyde, carboxylic acids such as oxalic acid and formic acid, amines such as triethylamine, metal hydrides such as sodium borohydride and lithium aluminum hydride and hydrazine are exemplified.

In a case where the fine catalyst particles are reduced using a reducing agent as the preparing methods of the resin-supported catalyst in the related art, the fine catalyst particles were supported onto a catalyst support in the following order. First, the fine catalyst particles are reduced using a reducing agent in advance. Next, the fine catalyst particles which were reduced by a reducing agent and precipitated are supported onto a catalyst support. That is, in the preparing methods of the resin-supported catalyst in the related art, after the fine catalyst particles which were reduced by a reducing agent and precipitated are dispersed into a solution, the fine catalyst particles are supported onto a catalyst support.

On the other hand, in the preparing method of the resin-supported catalyst according to the embodiment, fine catalyst particles are reduced by the phenolic hydroxyl group. Specifically, the reduction of the fine catalyst particles is carried out onto the surface of a thermosetting resin having the phenolic hydroxyl group. That is, in the preparing method of the resin-supported catalyst according to the embodiment, after the fine catalyst particles are brought into contact with a cured body of a thermosetting resin which is a catalyst support, the fine catalyst particles are reduced and precipitated. According to the preparing method of the resin-supported catalyst, it is possible to uniformly and finely support the fine catalyst particles onto a catalyst support. By doing this, it is possible to prepare resin-supported catalyst with excellent repeatability and use efficiency. The reason for this is not entirely clear, however, it is considered to be due to the precipitation of the fine catalyst particles which are reduced and supporting of the fine catalyst particles which are precipitated onto a catalyst support occurring almost at the same time. That is, it is considered that since the fine catalyst particles can be supported onto a catalyst support without dispersing the fine catalyst particles which are precipitated in a solution compared with the preparing methods of the resin-supported catalyst in the related art, it is possible to highly suppress agglomeration of the fine catalyst particles.

In the supporting method of the fine catalyst particles according to the embodiment, fine catalyst particles are reduced by a phenolic hydroxyl group in the liquid phase and the fine catalyst particles are supported onto a catalyst support having a phenolic hydroxyl group. When the fine catalyst particles are reduced by the phenolic hydroxyl group, it is preferable that the reducing agent is not added. By doing this, it is possible to reduce the fine catalyst particles on the surface of the thermosetting resin having the phenolic hydroxyl group. Therefore, it is possible to uniformly and finely support the fine catalyst particles onto the surface of the cured material of the thermosetting resin.

Furthermore, in the embodiment, the same one described in the first embodiment can be used as a cured body of a thermosetting resin, fine catalyst particles, a substrate-supported catalyst, a substrate, and a method for forming a cured body of a thermosetting resin onto the surface of the substrate.

The embodiments of the present invention have been described above, however, the embodiments are only examples of the present invention and various configurations other than that described above may also be employed.

EXAMPLE

Hereinafter, the invention will be described with reference to Examples and Comparative examples, but the invention is not limited thereto.

EXAMPLE A

EXAMPLE A1

(Preparation of Cured Body of Phenol Resin)
1300 parts of phenol, 1600 parts of 43% aqueous formaldehyde, 800 parts of water, 30 parts of triethylamine and 30 parts of polyvinyl alcohol (Kuraray Poval PVA117, a degree of saponification is 98%, a degree of polymerization is 1700) as a suspending agent were put into a cylindrical separable flask of 5 L equipped with a stirrer, a reflux condenser and a thermometer, and the resultant was heated at 100° C. for 3 hours, thereby synthesizing a spherical phenol resin cured body. Moreover, the reaction product was collected 1 hour after the reaction was started and was freeze-dried. A phenolic hydroxyl equivalent was measured by the acetylation method. A phenolic hydroxyl equivalent was 115 g/eq. The synthesized spherical phenol resin cured body was solid-liquid separated and the resultant was dried at 150° C., thereby obtaining a spherical phenol resin cured body having an average particle diameter of 100 p.m.

(Preparation of Resin-Supported Catalyst)
5 mg of palladium acetate (manufactured by Wako Pure Chemical Industries, Ltd.) and 500 mg of the above-described spherical phenol resin cured body which is a catalyst support, 0.15 mL of triethylamine (manufactured by Wako Pure Chemical Industries, Ltd.) and 5 mL of acetonitrile (manufactured by Wako Pure Chemical Industries, Ltd.) were blended and heated at 100° C. for 12 hours. Continuously, after the dispersion was filtered, the filtrate was washed and dried, thereby obtaining a resin-supported catalyst in which the palladium particles were supported onto the surface. The amount of the palladium catalyst supported in the resin-supported catalyst was 1% by weight. Furthermore, the specific surface area of the resin-supported catalyst was 10 $m^2/g$ or less. Moreover, the amount of the palladium catalyst supported was measured using a commercially available atomic absorption spectrophotometer and the specific surface area was measured by nitrogen gas using a 3 point BET method.

EXAMPLE A2

50 parts of methyl ethyl ketone was mixed with 50 parts of a commercially available resol type phenol resin (Sumitomo Bakelite Co., Ltd., SUMILITERESIN® PR-50087, phenolic hydroxyl equivalent is 130 g/eq) and the resultant was impregnated into a filter paper (ADVANTEC® No. 590) and dried at 180° C. for 1 hour, thereby obtaining a phenol resin cured body (phenol resin content was 50% by weight). Furthermore, a resin-supported catalyst was obtained in the same manner as in Example A1. The amount of the palladium catalyst supported in the resin-supported catalyst was 1% by weight and the specific surface area was 20 $m^2/g$.

EXAMPLE A3

A resin-supported catalyst (phenol resin content in the catalyst support was 50% by weight) was obtained in the same manner as in Example A2 except that 30 parts of a commercially available novolac type phenol resin (Sumitomo Bakelite Co., Ltd., SUMILITERESIN® PR-310, phenolic hydroxyl equivalent was 105 g/eq) was dissolved in 70 parts of methyl ethyl ketone. The amount of the palladium catalyst supported in the resin-supported catalyst was 1% by weight and the specific surface area was 25 $m^2/g$.

COMPARATIVE EXAMPLE A1

The spherical phenol resin cured product obtained in Example A1 was carbonized at 900° C. under a nitrogen stream and an air stream in a commercially available carbonization furnace. Furthermore, a resin-activated carbon-supported catalyst was obtained in the same manner as in Example A1. The amount of the palladium catalyst supported in the resin-activated carbon-supported catalyst was 1% by weight and the specific surface area was 950 $m^2/g$.

COMPARATIVE EXAMPLE A2

In Comparative Example A2, a commercially available palladium-urea resin (manufactured by Wako Pure Chemical Industries, Ltd., Pd EnCat 30) in which a cured body of a thermosetting resin not including a phenolic hydroxyl group was a catalyst support was used. The amount of the palladium catalyst supported in the palladium-urea resin was 4.2% by weight and the specific surface area was 10 $m^2/g$ or less.

COMPARATIVE EXAMPLE A3

In Comparative Example A3, a commercially available palladium-activated carbon (manufactured by Wako Pure Chemical Industries, Ltd., palladium-activated carbon) was used. The amount of the palladium catalyst supported in the palladium-activated carbon was 5% by weight and the specific surface area was 650 $m^2/g$.

(Evaluation Test)

Catalytic activity of a supported catalyst was evaluated by the reaction yield of trans-methyl cinnamate obtained by Fleck reaction of iodobenzene and methyl acrylate.

23 μL (0.20 mmol) of iodobenzene, 23 μL (0.25 mmol) of methyl acrylate and 35 μL (0.25 mmol) of triethylamine were dissolved in acetonitrile (2 mL). 50 mg of a supported catalyst was added into the obtained solution. The mixture was heated using oil bath and was stirred at 120° C. for 12 hours. After the reaction was completed, the supported catalyst was filtered.

The filtrate was concentrated under reduced pressure and the residue was purified by a silica gel chromatography (n-hexane:ethyl acetate=5:1), thereby obtaining trans-methyl cinnamate.

Moreover, if necessary, without extracting trans-methyl cinnamate, a certain amount of reaction solution was taken out and was analyzed using a liquid chromatography. Hereinafter, unless otherwise specified, the reaction yield was calculated from the area ratio of the chromatogram before and after the reaction. Here, the reaction yield is defined as $(C_0-C_f)/C_0 \times 100(\%)$. $C_0$ is the number of moles of iodobenzene before the reaction and $C_f$ is the number of moles of iodobenzene after the reaction.

(Repetition of Test)

After the reaction was completed, the supported catalyst was once retrieved from the reaction solution and washed. Subsequently, as a supported catalyst, the above-described Heck reaction was carried out again. A series of operations of these Heck reactions was repeated four times.

The results of the reaction yield of Heck reaction are shown in Table 1. The resin-supported catalysts according to the embodiment have a high reaction yield compared with the supported catalysts in the related art. That is, the catalyst use efficiency of the supported catalyst was excellent. Furthermore, a high reaction yield was maintained even after repeated use.

TABLE 1

| | Support | Specific surface area [$m^2/g$] | Amount of supported catalyst [wt %/support] | Reaction yield [%] Number of repetition | | | | |
|---|---|---|---|---|---|---|---|---|
| | | | | 1 | 2 | 3 | 4 | Average |
| Example A1 | Cured material of phenol resin | Equal to or less than 10 | 1 | 99 | 95 | 95 | 91 | 95 |
| Example A2 | Cured material of phenol resin | 20 | 1 | 98 | 95 | 95 | 92 | 95 |
| Example A3 | Cured material of phenol resin | 25 | 1 | 98 | 94 | 94 | 93 | 95 |
| Comparative Example A1 | Cured material of phenol resin | 950 | 1 | 92 | 87 | 79 | 69 | 82 |
| Comparative Example A2 | Cured material of urea resin | Equal to or less than 10 | 4.2 | 90 | 80 | 73 | 67 | 78 |
| Comparative Example A3 | Activated carbon | 650 | 5 | 70 note) | 52 note) | 50 note) | 48 note) | 55 note) | note)
Significant amount of a biphenyl compound was produced as a byproduct in Comparative Example A3

EXAMPLE B

EXAMPLE B1

(Preparation of Cured Body of Phenol Resin)

A sheet shaped polypropylene non-woven fabric (manufactured by Nippon Vilene Co., Ltd.) was immersed in a phenol resin solution in which a liquefied phenol resin (manufactured by Sumitomo Bakelite, SUMILITERESIN PR-50087) and methanol were mixed at a weight ratio of 1:1 at room temperature for one minute and the resultant was naturally dried at an ambient temperature for 30 minutes. After drying, the fabric was heated at 90° C. for 30 minutes and further heated at 150° C. for 30 minutes, thereby obtaining a sheet shaped phenol resin support including a phenol resin of 30% by weight.

(Preparation of Resin-Supported Catalyst)

10 mg of palladium acetate (manufactured by Wako Pure Chemical Industries, Ltd.), 1 g of the above-described phenol resin catalyst support which is catalyst support and 10 mL of acetonitrile (manufactured by Wako Pure Chemical Industries, Ltd.) were blended and heated at 100° C. for 12 hours in a sealed tube. Continuously, after taking out a phenol resin support with tweezers, the phenol resin support was washed and dried, thereby obtaining a phenol resin-supported catalyst in which the palladium particles were supported. The amount of the palladium catalyst supported in the phenol resin-supported catalyst was 1% by weight. The amount of the palladium catalyst supported was measured using a commercially available atomic absorption spectrophotometer.

EXAMPLE B2

10 mg of palladium acetate (manufactured by Wako Pure Chemical Industries, Ltd.), 1 g of phenol resin support prepared in the same manner as in Example B1, 0.03 mL of triethylamine (manufactured by Wako Pure Chemical Industries, Ltd., 5 mol with respect to palladium acetate) and 10 mL of acetonitrile (manufactured by Wako Pure Chemical Industries, Ltd.) were blended and heated at 100° C. for 12 hours in a sealed tube. Continuously, after taking out a phenol resin support with tweezers, the phenol resin support was washed and dried, thereby obtaining a phenol resin-supported catalyst in which the palladium particles were supported. The amount of the palladium catalyst supported in the phenol resin-supported catalyst was 1% by weight.

EXAMPLE B3

10 mg of palladium acetate (manufactured by Wako Pure Chemical Industries, Ltd.), 1 g of phenol resin support manufactured in the same manner as in Example B1, 0.3 mL of triethylamine (manufactured by Wako Pure Chemical Industries, Ltd., 50 mol with respect to palladium acetate) and 10 mL of acetonitrile (manufactured by Wako Pure Chemical Industries, Ltd.) were blended and heated at 100° C. for 12 hours in a sealed tube. Continuously, after taking out a phenol resin support with tweezers, the phenol resin support was washed and dried, thereby obtaining a phenol resin-supported catalyst in which the palladium particles were supported. The amount of the palladium catalyst supported in the phenol resin-supported catalyst was 1% by weight.

(Evaluation Test)

Catalytic activity of a supported catalyst was evaluated by the reaction yield of trans-methyl cinnamate obtained by Heck reaction of iodobenzene and methyl acrylate.

230 μL (2.0 mmol) of iodobenzene, 230 μL (2.5 mmol) of methyl acrylate and 350 μL (2.5 mmol) of triethylamine were dissolved in acetonitrile (20 mL). 500 mg of a supported catalyst was added into the obtained solution. The mixture was heated using oil bath and was stirred at 120° C. for 12 hours. After the reaction was completed, a supported catalyst was recovered by retrieving with tweezers or by filtering.

The reaction solution obtained by filtering was concentrated under reduced pressure, the residue was purified by a silica gel chromatography (n-hexane:ethyl acetate=5:1), thereby obtaining trans-methyl cinnamate. Moreover, if necessary, without extracting trans-methyl cinnamate, a certain amount of the reaction solution was taken out and was analyzed using a liquid chromatography. Hereinafter, unless otherwise specified, the reaction yield was calculated from the area ratio of the chromatogram before and after the reaction. Here, the reaction yield is defined as $(C_0-C_f)/C_0 \times 100(\%)$. $C_0$ is the number of moles of iodobenzene before the reaction and $C_f$ is the number of moles of iodobenzene after the reaction.

(Repetition of Test)

After the reaction was completed, a supported catalyst was retrieved from the reaction solution and washed. Subsequently, as a supported catalyst, the above-described Heck reaction was carried out using the retrieved supported catalyst. A series of operations of these Heck reactions was repeated until the reaction yield of trans-methyl cinnamate was below 80%. The results are shown in the following Table 2.

TABLE 2

| | | Example B1 | Example B2 | Example B3 |
|---|---|---|---|---|
| Blending amount of triethylamine | | 0 mL | 0.03 mL | 0.3 mL |
| Blending amount of triethylamine with respect to palladium acetate | | 0 mol | 5 mol | 50 mol |
| Reaction yield of per the number of repetition of test (%) | 1 | 96 | 98 | 100 |
| | 2 | 99 | 95 | 100 |
| | 3 | 100 | 100 | 100 |
| | 4 | 100 | 95 | 96 |
| | 5 | 97 | 98 | 100 |
| | 6 | 96 | 96 | 94 |
| | 7 | 95 | 97 | 100 |
| | 8 | 100 | 100 | 98 |
| | 9 | 100 | 91 | 100 |
| | 10 | 91 | 89 | 74 |
| | 11 | 100 | 96 | — |
| | 12 | 100 | 100 | — |
| | 13 | 100 | 100 | — |
| | 14 | 91 | 100 | — |
| | 15 | 98 | 98 | — |
| | 16 | 100 | 83 | — |
| | 17 | 99 | 78 | — |
| | 18 | 100 | — | — |
| | 19 | 100 | — | — |
| | 20 | 100 | — | — |
| | 21 | 92 | — | — |
| | 22 | 97 | — | — |
| | 23 | 100 | — | — |
| | 24 | 96 | — | — |
| | 25 | 87 | — | — |
| | 26 | 77 | — | — |

From Table 2, the phenol resin-supported catalysts of Examples become excellent from the viewpoint of repeated use of the catalyst as the blending amount of a reducing agent used in the preparing process is decreased. That is, by using the resin-supported catalyst according to the embodiment, excellent catalytic activity can be maintained for a long period of time without replacing the catalysts.

The invention includes the following aspects.

[1-1] A resin-supported catalyst including a cured body of a thermosetting resin having a phenolic hydroxyl group and fine particles having catalytic activity supported onto the surface of the cured body of the thermosetting resin.

[1-2] The resin-supported catalyst described in [1-1] in which a phenolic hydroxyl equivalent of the thermosetting resin is equal to or greater than 30 g/eq to equal to or less than 500 g/eq.

[1-3] The resin-supported catalyst described in [1-1] or [1-2] in which the thermosetting resin includes a phenol resin.

[1-4] The resin-supported catalyst described in any one of [1-1] to [1-3] in which a specific surface area measured by three-point BET method is equal to or less than 300 m²/g.

[1-5] The resin-supported catalyst described in any one of [1-1] to [1-4] in which the cured material of the thermosetting resin is obtained from curing the thermosetting resin at 250° C. or lower.

[1-6] The resin-supported catalyst described in any one of [1-1] to [1-5] in which after curing the thermosetting resin, the fine particles having the catalytic activity are supported onto the surface of the cured material.

[1-7] The resin-supported catalyst described in any one of [1-1] to [1-6] in which the fine particles having the catalytic activity include one or more kinds of metals, metal oxides and metal compounds.

[1-8] A method for preparing a resin-supported catalyst including a curing step in which a thermosetting resin having a phenolic hydroxyl group is subjected to a curing treatment and a supporting step in which fine particles having catalytic activity are supported onto the surface of the cured material of the thermosetting resin.

[1-9] The method for preparing a resin-supported catalyst described in [1-8] in which a phenolic hydroxyl equivalent of the thermosetting resin is equal to or greater than 30 g/eq to equal to or less than 500 g/eq.

[1-10] The method for preparing a resin-supported catalyst described in [1-8] or [1-9] in which the thermosetting resin includes a phenol resin.

[1-11] The method for preparing a resin-supported catalyst described in any one of [1-8] to [1-10] in which the curing step includes a step in which the thermosetting resin is cured at 250° C. or lower.

[2-1] A method for preparing a resin-supported catalyst including a curing step for curing a thermosetting resin having a phenolic hydroxyl group and a supporting step for supporting fine particles having catalytic activity onto the surface of the cured body obtained in the curing step, in which the fine particles are formed by the material composed of any one or more kinds of metals, metal oxides and metal compounds, and the supporting step includes a reducing step for reducing the fine particles by the phenolic hydroxyl group.

[2-2] The method for preparing a resin-supported catalyst described in [2-1] in which in the reducing step, being equal to or greater than 0 mol to being equal to or less than 10 mol of a reducing agent selected from a group consisting of hydrogen, carbon monoxide, aldehydes, carboxylic acids, amines, metal hydrides and hydrazine is contained with respect to 1 mol of the material.

[2-3] The method for preparing a resin-supported catalyst described in [2-1] in which in the reducing step, any reducing agent selected from a group consisting of hydrogen, carbon monoxide, aldehydes, carboxylic acids, amines, metal hydrides and hydrazine is not added.

[2-4] The method for preparing a resin-supported catalyst described in any one of [2-1] to [2-3] in which the fine particles are formed by the material including any one or more kinds of metals composed of titanium, chromium, cobalt, nickel, copper, ruthenium, rhodium, palladium, rhenium, osmium, platinum, iron, zinc, manganese, magnesium, calcium, silver, vanadium and tin, and the oxides thereof, other metal compounds and complexes formed of organic titanium.

[2-5] The method for preparing a resin-supported catalyst described in any one of [2-1] to [2-4] in which the thermosetting resin is a phenol resin.

[2-6] The method for preparing a resin-supported catalyst described in any one of [2-1] to [2-5] in which the curing step is a step in which the thermosetting resin is cured at 250° C. or lower.

[2-7] The method for preparing a resin-supported catalyst described in any one of [2-1] to [2-6] further including a step in which a substrate is prepared, in which the supporting step is a step which forms the cured body of the thermosetting resin onto the surface of the substrate and supports the fine particles having the catalytic activity onto the surface of the thermosetting resin.

[2-8] The method for preparing a resin-supported catalyst described in any one of [2-1] to [2-7] in which a phenolic hydroxyl equivalent of the thermosetting resin is 500 g/eq or less.

Priority is claimed on Japanese Patent Application No. 2011-193647, filed on Sep. 6, 2011, and Japanese Patent Application No. 2012-174359, filed on Aug. 6, 2012, the contents of which are incorporated herein by reference.

The invention claimed is:

1. A method for preparing a resin-supported catalyst comprising:
  a curing step for curing a phenol resin; and
  a supporting step for supporting fine particles having catalytic activity onto the surface of the cured body obtained in the curing step,
  wherein, the fine particles are formed by a material composed of any one or more kinds of metals, metal oxides and metal compounds,
  the supporting step includes a reducing step for reducing the fine particles by the phenolic hydroxyl group,
  a phenolic hydroxyl equivalent of the phenol resin is equal to or greater than 30 g/eq and equal to or less than 500 g/eq, and
  the reducing step is a step in which a reducing agent is not used.

2. The method for preparing a resin-supported catalyst according to claim 1,
  wherein, the fine particles are formed by a material including any one or more kinds of metals composed of titanium, chromium, cobalt, nickel, copper, ruthenium, rhodium, palladium, rhenium, osmium, platinum, iron, zinc, manganese, magnesium, calcium, silver, vanadium and tin, and the oxides thereof, other metal compounds formed of organic titanium and complexes.

3. The method for preparing a resin-supported catalyst according to claim 1,
  wherein, the curing step is a step in which the phenol resin is cured at 250° C. or lower.

4. The method for preparing a resin-supported catalyst according to claim 1,
  wherein, after curing the phenol resin, the fine particles are supported onto the surface of the cured body.

* * * * *